(12) United States Patent
Chen et al.

(10) Patent No.: US 9,029,756 B2
(45) Date of Patent: May 12, 2015

(54) OPTICAL DISPLACEMENT DETECTION APPARATUS AND OPTICAL DISPLACEMENT DETECTION METHOD

(75) Inventors: Hui-Hsuan Chen, HsinChu (TW);
Hsin-Chia Chen, HsinChu (TW);
Han-Chi Liu, HsinChu (TW);
Ching-Lin Chung, HsinChu (TW);
Yen-Min Chang, HsinChu (TW)

(73) Assignee: Pixart Imaging Incorporation, R.O.C., Hsinchu (TW)

( * ) Notice: Subject to any disclaimer, the term of this patent is extended or adjusted under 35 U.S.C. 154(b) by 513 days.

(21) Appl. No.: 13/445,639

(22) Filed: Apr. 12, 2012

(65) Prior Publication Data
US 2012/0200861 A1 Aug. 9, 2012

Related U.S. Application Data

(63) Continuation-in-part of application No. 11/950,710, filed on Dec. 5, 2007, now abandoned.

(51) Int. Cl.
*G09G 5/00* (2006.01)
*G01B 11/00* (2006.01)
*G06F 3/0354* (2013.01)
*G01S 7/481* (2006.01)
*G01S 17/58* (2006.01)
*G06F 3/03* (2006.01)

(52) U.S. Cl.
CPC ............ *G01B 11/002* (2013.01); *G06F 3/0354* (2013.01); *G01S 7/4815* (2013.01); *G01S 17/58* (2013.01); *G06F 3/0317* (2013.01); *G06F 3/03543* (2013.01)

(58) Field of Classification Search
CPC .............................. G06F 3/033; G06F 3/0354
USPC ............... 250/221, 208.1; 345/153, 163, 165, 345/166, 158
See application file for complete search history.

(56) References Cited

U.S. PATENT DOCUMENTS

2005/0231482 A1* 10/2005 Theytaz et al. ............... 345/166

* cited by examiner

*Primary Examiner* — Kevin Pyo
(74) *Attorney, Agent, or Firm* — Tung & Associates

(57) ABSTRACT

The present invention discloses an optical displacement detection apparatus and an optical displacement detection method. The optical displacement detection apparatus comprises: at least two light sources for projecting light of different spectrums to a surface under detection, respectively; an image capturing device for receiving light reflected from the surface under detection and converting it into electronic signals; and a processing control circuit for calculating displacement according to the electronic signals from the image capturing device, wherein the processing control circuit is capable of switching between the light sources.

10 Claims, 11 Drawing Sheets

OPTICAL DISPLACEMENT DETECTION APPARATUS AND OPTICAL DISPLACEMENT DETECTION METHOD

CROSS-REFERENCES TO RELATED APPLICATIONS

This application is a continuation-in-part of U.S. Ser. No. 11/950,710, filed on Dec. 5, 2007 now abandoned.

BACKGROUND OF THE INVENTION

1. Field of the Invention

The present invention relates to an optical displacement detection apparatus and an optical displacement detection method, which adaptively adjust the light spectrum according to reflected light from a detected object, so as to determine the displacement more accurately.

2. Descriptions of the Related Art

Optical displacement detection apparatus has been widely used in many applications, one of which is the optical mouse. In an optical mouse, light emitted from a light source is projected on the surface of a desk or an object, reflected thereby, and received by a sensor chip which is disposed in the optical mouse. The sensor chip converts the optical signals into electronic signals, which are processed by a processor to determine the displacement of the mouse.

Currently, there are two types of mice, one of which employs a general light emission diode (LED), most often red LED, to emit light, and the other of which employs a laser diode (LD) to emit laser beams. In the context of this specification, a mouse which employs the LED is referred to as a "general optical mouse," while a mouse which employs the LD is referred to as a "laser mouse", and collectively named as "optical mice."

The general optical mouse and the laser mouse operate under the same principle. The differences are in the light spectrums and the capability to recognize the surface under detection. A general optical mouse detects the pattern on the surface, and a laser mouse detects the roughness of the surface. Hence, each type of mouse has its advantages and weaknesses.

More specifically, for a general optical mouse, when the surface under detection has a color similar to the color of light emitted by the LED, the light scattering effect will seriously reduce the sensitivity of the sensor chip to recognize the pattern on the surface. The features of the pattern become less recognizable, and lead to inaccurate displacement calculation.

As for a laser mouse, when the roughness of the surface under detection is low, even if there is a clear pattern on the surface, misjudgment may occur.

U.S. Pat. No. 6,963,059 proposes a method to regulate the power of a light source. However, this does not solve the above problems.

Furthermore, it is understandable that the entire energy of the light beam is constant and the sensitivity of an optical mouse would depend on the optical strength or the illumination area of the light beam. When the illumination area of the light beam is smaller, the optical strength would be greater; on the contrary, when the illumination area of the light beam is wider, the optical strength would be weaker. It would be more significant when the optical mouse is working in a poor light-reflecting or scattering environment. The light strength received by the sensor would be much weaker and thus erroneous detections may probably occur.

Furthermore, in the laser mouse, a laser diode is adopted as the light source. The laser beams are always regulated at a certain angle according to a certain environment or working surface. However, the sensitivity of the laser optical mouse would be influenced due to different reflection indexes of the different operational surfaces. For example, when a laser optical mouse designed for a rough surface is working on a flat surface, merely very few of the reflected light beams would be detected by the sensor and thus the sensitivity would be decreased. If plural sets of lens are equipped for different surfaces to solve the problems, it would bring other disadvantages such as increasing the manufacturing cost and the volume of the optical mouse.

As for the sensor, it is generally constituted by a plurality of sensor unites to determine the movement by sensing the speckles from the reflective surface. Conventionally, a distance between the geometric centers of any two sensor units of the sensor chip is larger than 30 micrometers. However, the conventional laser optical mouse may be insufficient to accurately determine the movement because a distance between any two speckles formed by the laser diode illuminating surface details on the laser optical mouse is only about 7 micrometers, which is much shorter than 30 micrometers.

SUMMARY OF THE INVENTION

One objective of the present invention is to provide an optical displacement detection apparatus, which adaptively adjusts the light spectrum according to the reflected light from a surface so as to determine the displacement more accurately.

Another objective of this invention is to provide an optical displacement detection apparatus having the light beams being concentrated. In the optical displacement detection apparatus of the present invention, the illumination area of the light beam is optically narrowed so as to enhance the optical strength of the light beams. The optical condensation would effectively increase the sensitivity of the optical displacement detection apparatus.

Yet a further objective of this invention is to provide an optical displacement detection apparatus which has the light beams being scattered with different incident angles with respect to the reflective surface. Thus, the optical displacement detection apparatus would be suitable for use on various working surfaces with different roughness.

An additional objective of this invention is to provide an optical displacement detection apparatus having a well arranged sensor units of the image sensor for sensing speckles reflected formed on the reflective surface. The distance between the geometric centers of two nearest sensor units is shorter than 30 micrometers.

To achieve the objectives, an optical displacement detection apparatus comprises: at least two light sources for projecting light with different spectrums respectively; an optical transfer assembly concentrating and projecting the light to a surface; an image capturing device for receiving the light reflected from the surface and generating electronic signals; and a processing control circuit for determining the displacement of the optical displacement detection apparatus according to the electronic signals from the image capturing device. Thus, the light would be concentrated to enhance the sensitivity of the optical displacement detection apparatus.

In another embodiment, an optical displacement detection apparatus comprising at least two light sources, a lens, an image capturing device and a processing control circuit is provided. The at least two light sources project light with different spectrums respectively. The lens has a plurality of emitting surfaces with different normals for transferring the light into a plurality of light beams with different incident angles on the surface. The image capturing device receives the light beams reflected from the surface and generating electronic signals. The processing control circuit determines a displacement of the optical displacement detection apparatus according to the electronic signals from the image capturing device. Thus, the optical displacement detection apparatus would be further suitable for use on various working surfaces with different roughness.

In the above-mentioned apparatus, the light sources may be light emitting diodes (LEDs) in different colors, or a light emitting diode (LED) and a laser diode (LD).

It is also feasible that the optical displacement detection of the present invention utilizes a single light source projecting mixed light having at least two primary wavelengths.

In one embodiment, an optical displacement detection apparatus comprising a light source, an optical transfer assembly, an image capturing device and a processing control circuit is provided. The light source projects mixed light including at least two primary wavelengths. The optical transfer assembly concentrates and projects the mixed light to a surface. The image capturing device receives the mixed light reflected from the surface and generates at least two electronic signals corresponding the at least two primary wavelengths. The processing control circuit determines the displacement of the optical displacement detection apparatus according to the electronic signals from the image capturing device.

In another embodiment, an optical displacement detection apparatus comprising a light source projecting, a lens, an image capturing device and a processing control circuit is provided. The light source projects mixed light including at least two primary wavelengths. The lens has a plurality of emitting surfaces with different normals for transferring the light into a plurality of light beams with different incident angles on the surface. The image capturing device receives the light beams reflected from the surface and generates at least two electronic signals corresponding the at least two primary wavelengths. The processing control circuit is then capable of determining the displacement of the optical displacement detection apparatus according to the electronic signals from the image capturing device.

In some of the above-mentioned apparatuses, preferably, the image capturing device includes two sensor circuits having color filter layers of different colors, respectively, or the apparatus further includes two color lenses to filter light to be sensed by the two sensor circuits, respectively.

For better understanding the objects, characteristics, and effects of the present invention, the present invention will be described below in detail by illustrative embodiments with reference to the attached drawings.

DESCRIPTION OF THE PREFERRED EMBODIMENT

Figure 1:
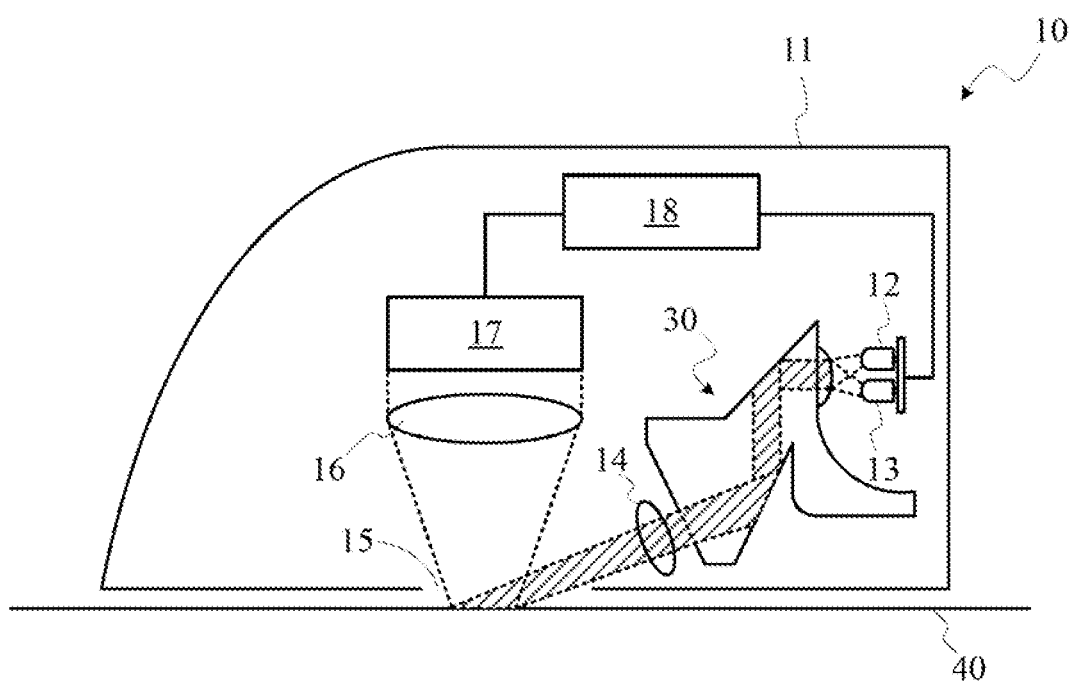
FIG. 1 shows the first embodiment of the present invention.
Figure 2:
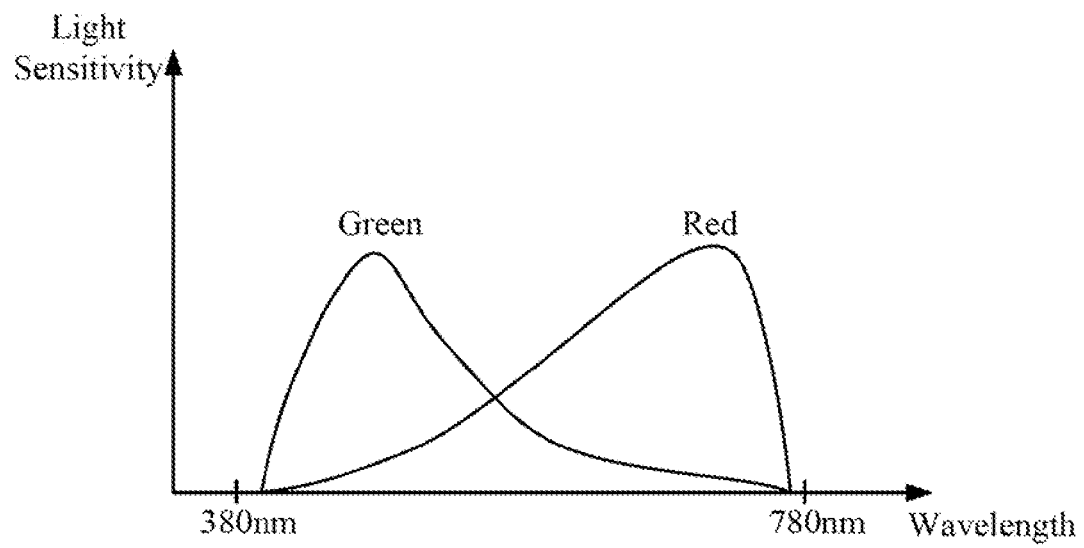
FIGS. 2 and 3 show the spectrums of LEDs emitting different colors.
Figure 3:
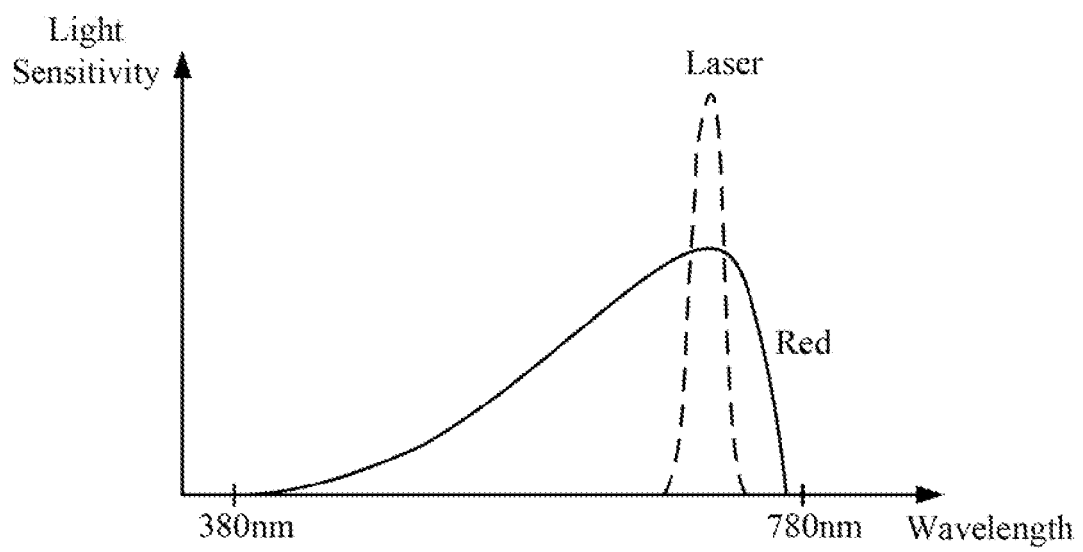

FIG. 1 shows a first embodiment of the present invention. The mouse 10 of this embodiment includes two light sources 12 and 13 disposed in the housing 11 so that the mouse 10 can switch the light sources 12 and 13. The light sources 12 and 13 may be two general light emitting diodes (LEDs) emitting light with different colors, such as red and green, or a general LED and a laser diode (LD). The spectrums of red and green LEDs are shown in FIG. 2, and the spectrums of a general LED and an LD are shown in FIG. 3. As shown in the figures, different optical sources have different bandwidths and light sensitivities.

In this embodiment, the mouse 10 further comprises an optical transfer assembly 30 being disposed on the transmission path to receive the light emitted from the light sources 12 and 13. The optical transfer assembly 30 is characterized in concentrating the light and projecting the condensed light to a surface 40.

Figure 4:
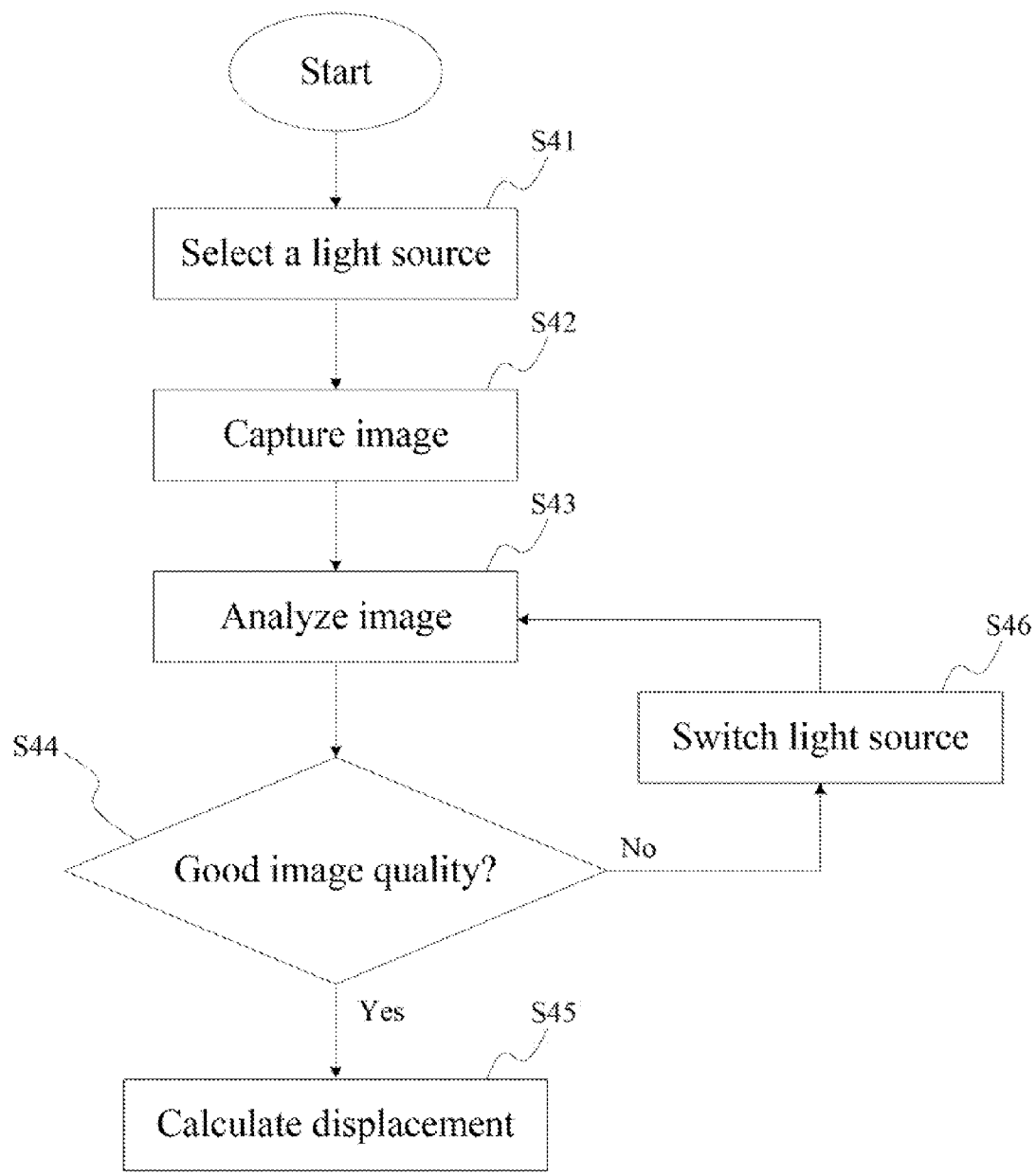
FIG. 4 shows a flow chart corresponding to the optical displacement detection apparatus.

Referring to FIG. 1 in conjunction with the flow chart of FIG. 4, when the mouse 10 starts to operate, it can arbitrarily select one of its light sources, such as the light source 12 (step S41). The light emitted from the light source 12, after condensed by the optical transfer assembly 30 and a first lens 14, passes through an opening 15 on the mouse housing 11 and projects on the surface 40 of a desk or an object (not shown). The light reflected from the surface 40 passes though a second lens 16 and is received by an image capturing device (step S42). In one embodiment, the image capturing device is a sensor chip 17; however, it can be any other device capable of capturing an image. The sensor chip 17 converts the received optical signals into electronic signals, and outputs the electronic signals to a processing control circuit 18 for analysis (step S43).

When the image received by the sensor chip 17 includes recognizable features, the processing control circuit 18 would be capable of determining a displacement of the mouse 10 according to any proper method well known by those skilled in this art (step S45). For example, if the light source 12 is an LED, the displacement can be determined by comparing the patterns of two successive images. If the light source 12 is an LD, the displacement can be determined by comparing the locations of a roughness feature in two successive images. The details of such calculation are omitted here because they are not the critical part of the present invention.

When the surface 40 has a color similar to the color of the light source 12, the image received by the sensor chip 17 may have insufficient features. According to the poor quality of the image, the processing control circuit 18 may send a control signal to switch to the other light source 13 (step S46). The optical spectrum would then be changed and thus avoid the disadvantages caused by scattering. Or, if the light source 12 is an LD and when the surface 40 is not rough, the image received by the sensor chip 17 may have insufficient features. According to the poor quality of the image, the processing control circuit 18 would send a control signal to switch to the other light source 13 (step S46). When the image received by the sensor chip 17 includes recognizable features, the processing control circuit 18 determines displacement of the mouse 10 based on the features (step S45).

The aforesaid "feature" can be extracted, or recognized, according to a method below: generating a brightness distribution map for the received image, and defining pixels which have an absolute or relative brightness value larger than a threshold to be features. The displacement can be determined by comparing the features of two successive images. On the other hand, if there is no meaningful feature in an image, for example when the feature ratio (the feature area over total area) of an image is too high or too low, it means that the image has poor quality.

Figure 5A:
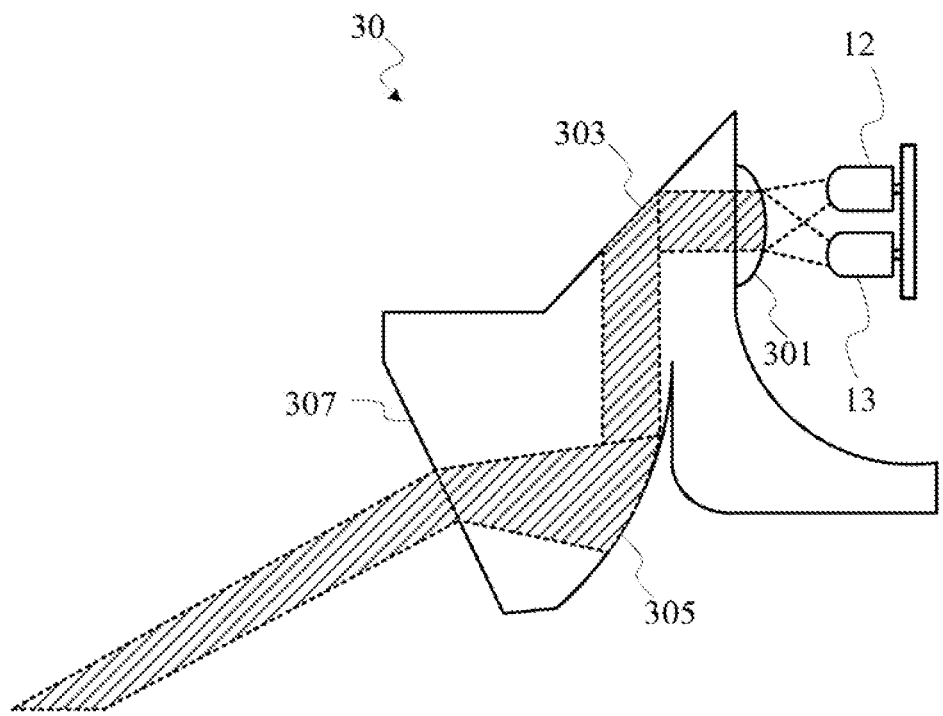
FIGS. 5A, 5B and 5C illustrate the optical transfer assembly of the embodiment.
Figure 5B:
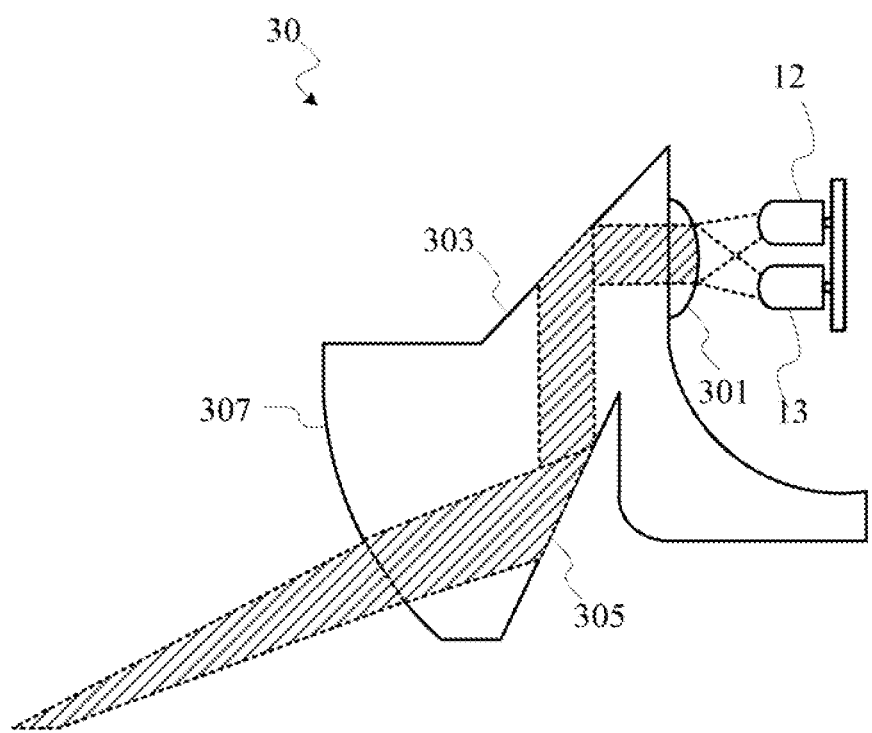
Figure 5C:
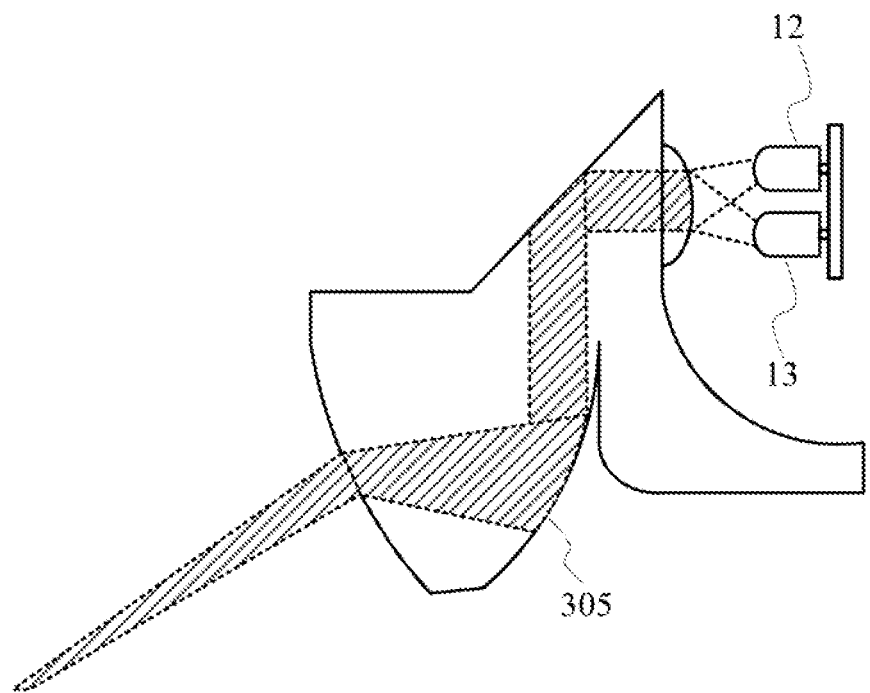

In a preferred embodiment, it is characterized in that the optical transfer assembly 30 is utilized to concentrate the light emitted from the light sources 12 and 13 to enhance the sensitivity. Specifically, as shown in FIGS. 5A, 5B and 5C, the optical transfer assembly 30 comprises an inlet lens 301, a first directing surface 303, a second directing surface 305 and a refracting surface 307 sequentially disposed on the transmission path of the light. The inlet lens 301 is capable of receiving and focusing the light. The first directing surface 303 reflects the light from the inlet lens 301 towards the second directing surface 305. The second directing surface 305 is then reflecting the light which is from the first directing surface 303 towards the refracting surface 307. Finally, the refracting surface 307 directs the light towards the surface 40.

For the objective of enhancing the optical strength of the light, the inlet lens 301 is a convex lens, and at least one of the second reflecting surface 305 and the refracting surface 307 is a curved surface.

As shown in FIG. 5A, the second reflecting surface 305 is a curved surface. Specifically, the light projected from the light sources 12 and 13 is reflected by the first directing surface 303 and travels downward to the second reflecting surface 305. After the reflection of the curved second reflecting surface 305, the light would be narrowed and concentrated, so as to enhance the optical strength of the light and compensate the attenuation due to the reflection in the optical transfer assembly 30.

As shown in FIG. 5B, it is also feasible that the first directing surface 303 and the second reflecting surface 305 are both flat surfaces, and only the refracting surface 307 is a curved surface. In this embodiment, the light is finally refracted by the curved refracting surface 307, which can narrow and concentrate the light, so as to enhance the optical strength and compensate the attenuation.

Conceivably, as show in FIG. 5C, it is a preferable embodiment that both of the second reflecting surface 305 and the refracting surface 307 are curved surfaces. As for the above-mentioned curved surface, an angle between a normal of maximum curvature of the curved surface and the reflective surface is preferably about 20 degrees.

Figure 6:
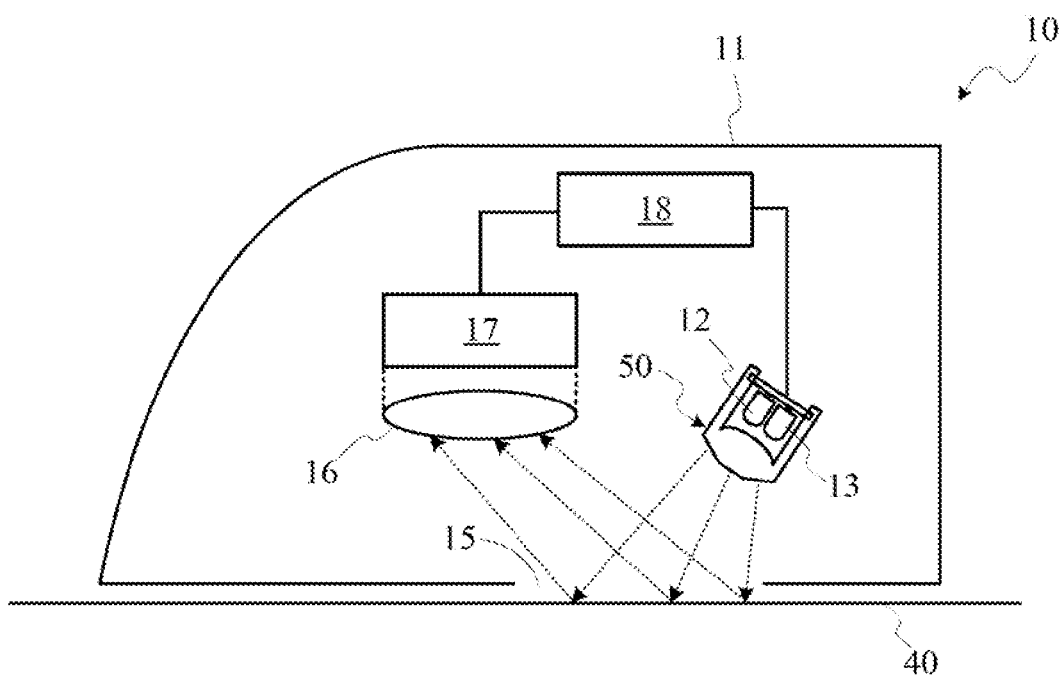
FIG. 6 shows the second embodiment of the present invention.

FIG. 6 shows the second embodiment of the present invention. Similar to the first embodiment, the optical displacement detection apparatus (that is, the mouse 10) in this embodiment comprises at least two light sources 12 and 13, an image capturing device (that is, the sensor chip 17), and a processing control circuit 18. The mouse 10 further comprises a lens 50 having a plurality of emitting surfaces with different normals. The emitting surfaces transfer the light into a plurality of light beams with different incident angles on the surface 40.

More specifically, because the emitting surfaces of the lens 50 has different normals, the light emitted from the light sources 12 and 13 is refracted into the plurality of light beams having a plurality of different incident angles on the surface 40. Therefore, even if the surface 40 is with different reflection indexes (for example, the surface 40 being with different degrees of roughness), the light beams being received by the sensor chip 17 would be sufficient to recognize the features of the successive images so as to determine the movement of the mouse 10. Thus, the lens 50 having the emitting surfaces with different normals would improve the sensitivity, especially when the mouse 10 is working on the opaque surface that has different reflection indexes.

Other optical and electrical element as well as the working processes utilized in this embodiment, such as the second lens 16, the image capturing device (that is, the sensor chip 17), and the processing control circuit 18, are similar to the above-mentioned embodiment and thus are not superfluously described herein.

Figure 7A:
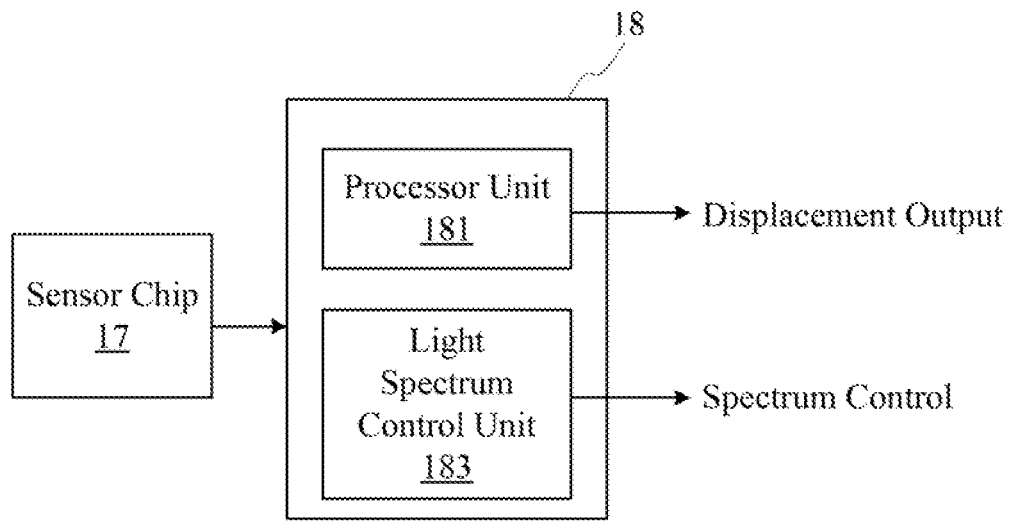
FIGS. 7A and 7B show two embodiments of the processing control circuit.
Figure 7B:
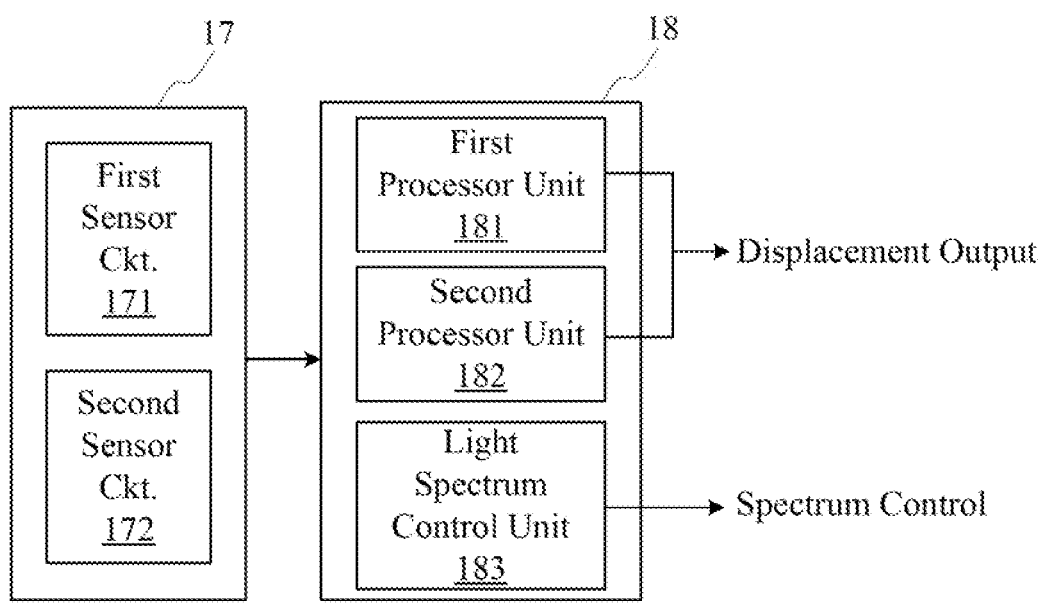

FIGS. 7A and 7B show the internal circuit structure of the processing control circuit 18. If both of the light sources 12 and 13 are general LEDs, only one sensor circuit and a corresponding processor unit 181 are required to sense the light and to generate the electronic signals. If the light sources 12 and 13 are a general LED and an LD, two sensor circuits 171 and 172 are required to sense the normal light beams from the LED and the laser light beams from the LD and to generate the electronic signals respectively. Likewise, two processor units 181 and 182 are needed to process the electronic signals from the sensor circuits 171 and 172 and to determine the displacement of the mouse 10 according to different types of features. Note that the hardware structures shown in the figures are only illustrated for examples among many possible arrangements. The two sensor circuits 171 and 172 can be integrated into one circuit, and the calculation for the displacement according to different types of features can be done by the same processor unit according to different algorithms, e.g., different programs or different subroutines in the same program.

Figure 8A:
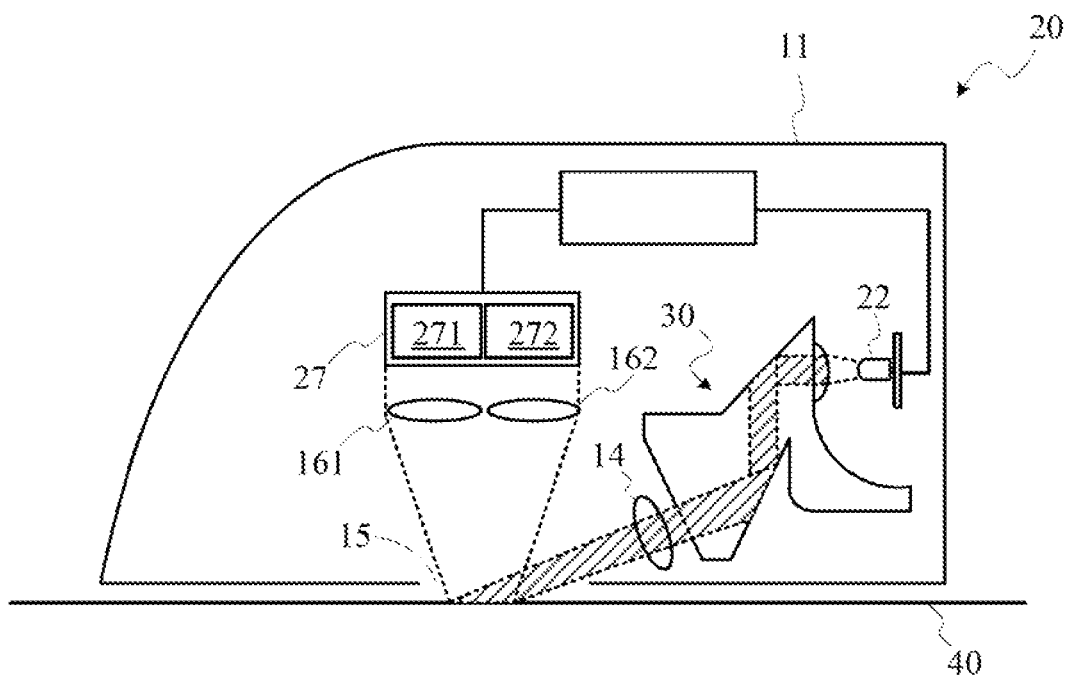
FIGS. 8A and 8B shows embodiments of the present invention utilizing one light source.
Figure 8B:
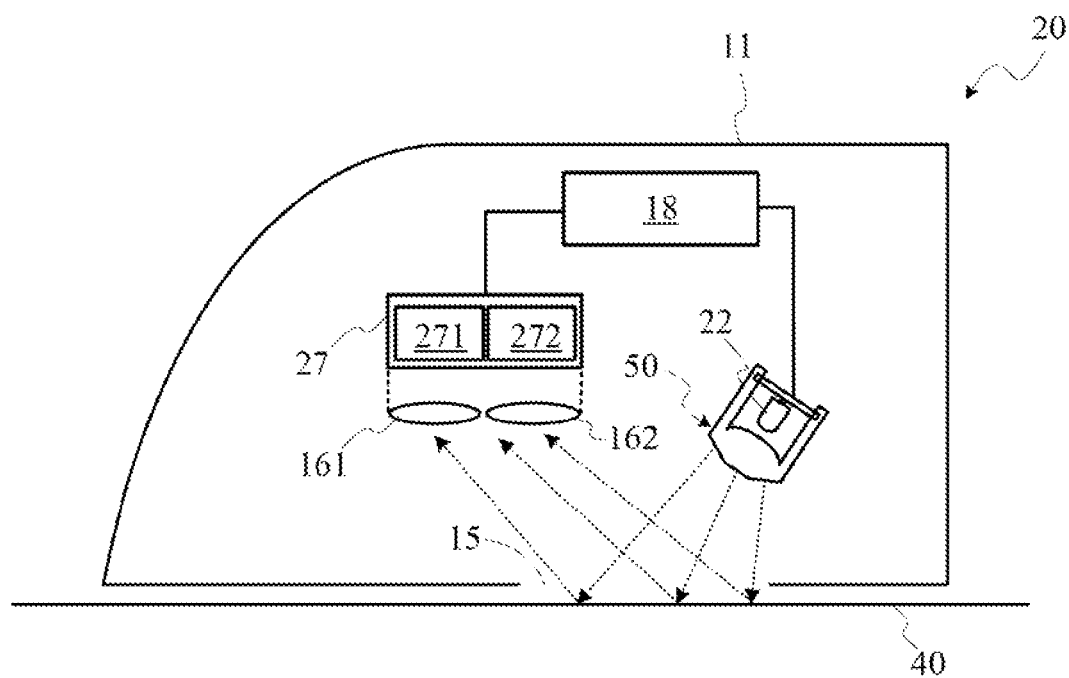

FIGS. 8A and 8B show the embodiments being characterized in that the mouse 20 has only one light source 22. The light source 22 emits mixed light which includes at least two primary wavelengths. For example, the light source 22 can be a white LED, or any other light source capable of emitting mixed light.

The mouse 20 shown in FIG. 8A is similar to the first embodiment in its structural arrangements. Light emitted from the light source 22 is concentrated and condensed by the optical transfer assembly 30. The light then travels through the first lens 14, passes through the opening 15 on the housing 11 and projects onto the surface 40 of an object (not shown). The light is expected to be reflected by the surface 40 and returns to the inside of the mouse 20. This embodiment is different from the previous embodiment in that the image capturing device 27 includes two sensor circuits 271 and 272 to sense different wavelengths of light and to generate at least two electronic signals corresponding to the different wavelengths. As shown in FIG. 8B, the present invention further discloses the mouse 20 being equipped with a lens 50, as the structure of the second embodiment. More specifically, the lens 50 has a plurality of emitting surfaces with different normals. The emitting surfaces transfer the light into a plurality of light beams with different incident angles on the surface 40.

Figure 9:
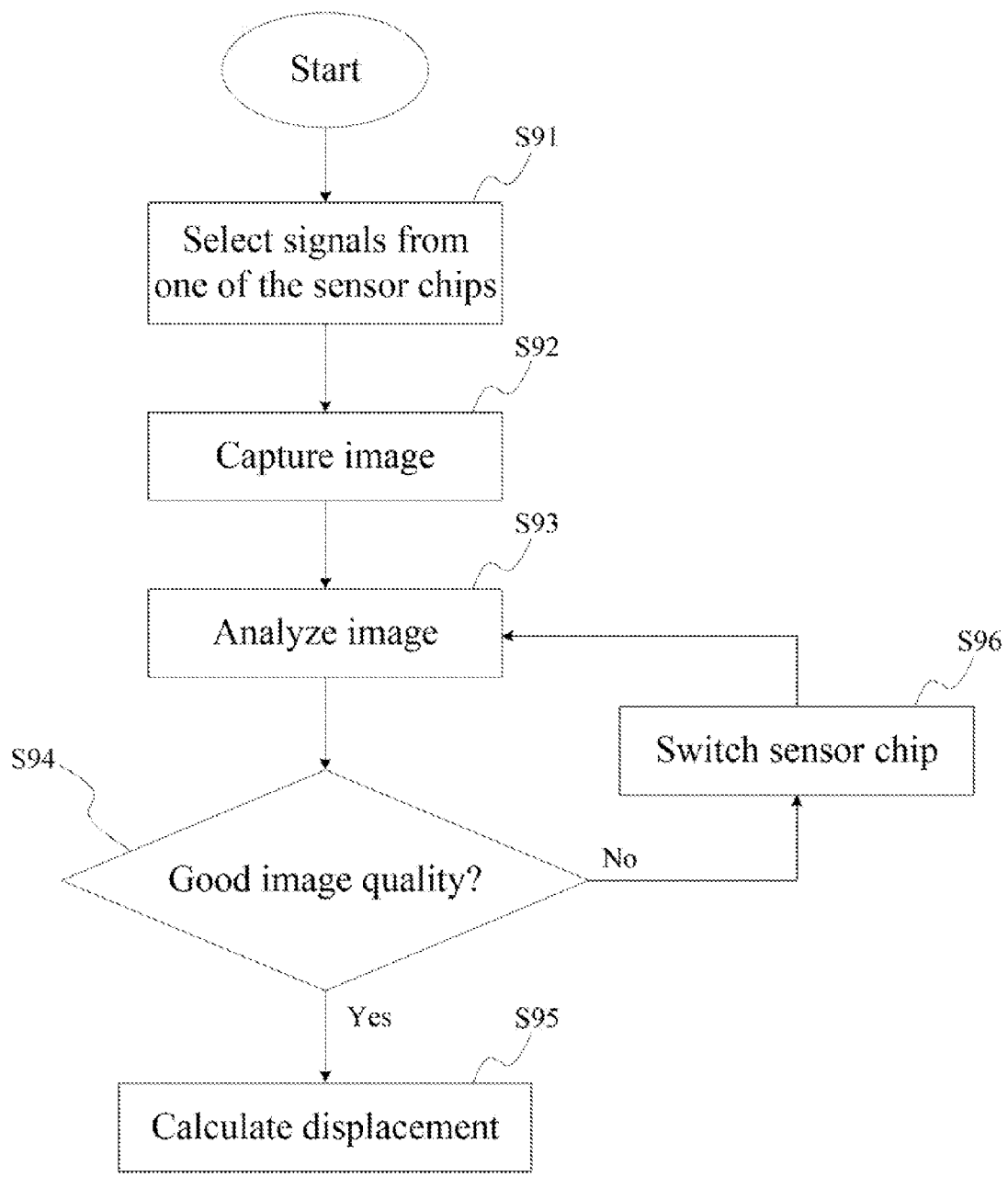
FIG. 9 shows a flow chart corresponding to the embodiments of FIGS. 8A and 8B.

In one embodiment, different wavelengths of light may be sensed by providing two filter lenses 161 and 162 of different colors, as shown in the figure. In another embodiment (not shown), only one lens is provided, but the two sensor circuits 271 and 272 are each provided with a color filter layer of a different color. The two sensor circuits 271 and 272 are utilized to sense different wavelengths of light and convert the optical signals into electronic signals. The electronic signals are then transmitted to the processing control circuit 18. The processing control circuit 18 would be able to determine the displacement of the mouse 20 according to the signals from one of the sensor circuits. More specifically, in one embodiment, the processing control circuit 18 receives the signals from both sensor circuits 271 and 272, and determines the displacement according to the signals with better image quality. In another embodiment, the processing control circuit 18 switches between signals from two sensor circuits 271 and 272; that is, it only receives signals from one of the sensor circuits at a given time point, and judges the image quality according to the received signals. If the image quality is poor, the processing control circuit 18 switches to adopt the signals from the other sensor circuit, as shown by steps S91-S96 of FIG. 9.

Figure 10:
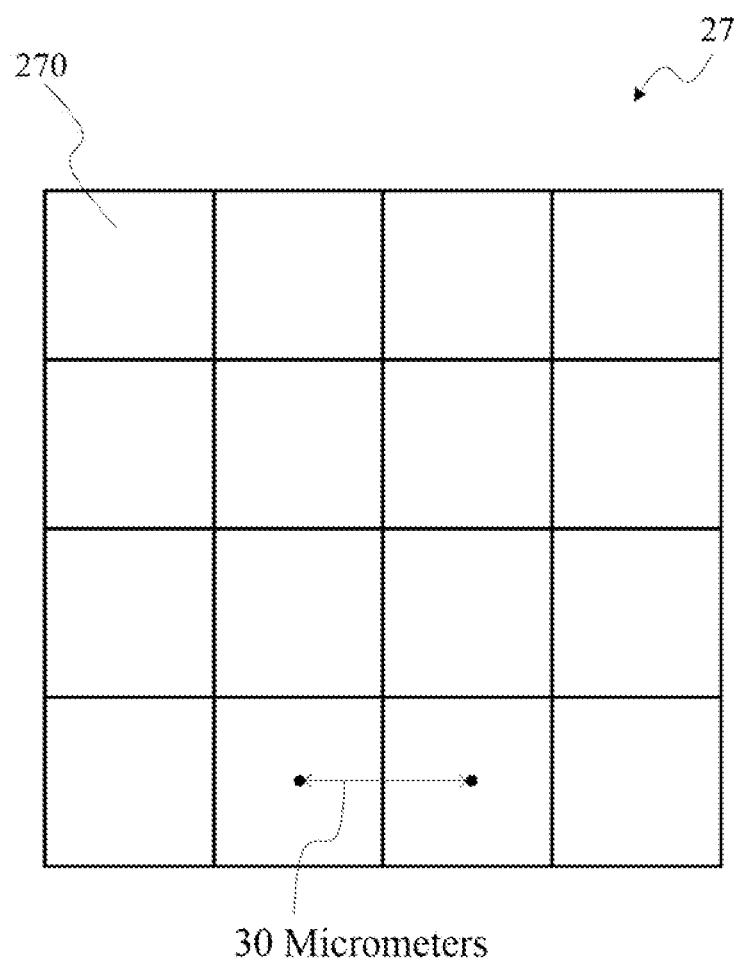
FIG. 10 illustrates the arrangement of the image capturing device.

FIG. 10 shows a further embodiment. As mentioned previously, a distance between any two speckles which is formed after the light being projected onto the reflective surface 40 is approximately equal to 7 micrometers. In the abovementioned embodiments, the image capturing device 27 (or each of the sensor circuits 271 and 272) has a plurality of sensor units 270 for sensing speckles formed on the reflective surface 40 and generating image. As shown in FIG. 10, the sensor units 270 are preferably arranged in the form of a matrix. Each of the sensor units 270 is able to be defined with a geometric center and the sensor units 270 are arranged to have a distance between the geometric centers of two nearest sensor units being shorter than 30 micrometers. The image capturing device 27 would be suitable for sensing most of the speckles. Therefore, even if in lack of any additional lens, the image capturing device 27 would be sufficient to identify the speckles accurately, and the optical displacement detection apparatus determine its movement accordingly.

By switching between signals resulting from different wavelengths of light, this embodiment also avoids the problem caused by light scattering due to similar colors of the surface under detection and the light source.

The optical displacement detection apparatus and method disclosed in the present invention not only can be applied to optical mice, but also can be applied to any other apparatus which is designed to trace the movement of an object.

In summary, the optical displacement detection apparatus of the present invention would be more sensitive and accurate in determining the movement. It is also suitable for being used on various working surfaces with different roughness.

The features, characteristics and effects of the present invention have been described with reference to its preferred embodiments, for illustrating the spirit of the invention rather than limiting the scope of the invention. Various other substitutions and modifications will occur to those skilled in the art, without departing from the spirit of the present invention. For example, the lenses shown in the embodiments are not necessarily required. Each of the circuits 17, 18, 171, 172, 181, 182, 183, 271 and 272 does not have to be a stand-alone circuit as shown, but instead can be integrated with other circuits in various manners. Thus, all such substitutions and modifications are intended to be embraced within the scope of the invention as defined in the appended claims.

What is claimed is:

1. An optical displacement detection apparatus, comprising:

at least two light sources projecting light with different spectrums respectively;

an optical transfer assembly concentrating and projecting the light towards a surface, wherein the optical transfer assembly comprises an inlet lens, a first directing surface, a second directing surface and a refracting surface sequentially disposed on a transmission path of the light, wherein the inlet lens focuses the light, the first directing surface reflects the light from the inlet lens towards the second directing surface, the second directing surface reflects the light from the first directing surface towards the refracting surface, and the refracting surface directs the light towards the surface;

an image capturing device receiving the light reflected from the surface and generating electronic signals; and a processing control circuit determining a displacement of the optical displacement detection apparatus according to the electronic signals from the image capturing device.

2. The optical displacement detection apparatus as claimed in claim 1, wherein at least one of the second reflecting surface and the refracting surface is a curved surface, and the inlet lens is a convex lens.

3. The optical displacement detection apparatus as claimed in claim 2, wherein an angle between a normal of maximum curvature of the curved surface and the reflective surface is about 20 degrees.

4. The optical displacement detection apparatus as claimed in claim 2, wherein the at least two light sources includes light emitting diodes (LEDs) emitting light with different colors.

5. The optical displacement detection apparatus as claimed in claim 2, wherein the at least two light sources comprises a light emitting diode (LED) and a laser diode (LD).

6. The optical displacement detection apparatus as claimed in claim 5, wherein the image capturing device includes two sensor circuits for sensing the light from the light emitting diode and the light from the laser diode and generating the electronic signals, respectively.

7. The optical displacement detection apparatus as claimed in claim 6, wherein the processing control circuit includes two processor units for processing the electronic signals from the sensor circuits, respectively.

8. The optical displacement detection apparatus as claimed in claim 6, wherein the processing control circuit processes the electronic signals corresponding to the light from the light emitting diode and the light from the laser diode by different algorithms, respectively.

9. The optical displacement detection apparatus as claimed in claim 2, wherein the image capturing device receives the light to form an image, and the processing control circuit is capable of switching the light sources according to a quality of the image.

10. The optical displacement detection apparatus as claimed in claim 2, wherein the image capturing device has a plurality of sensor units arranged as a matrix for sensing speckles formed on the surface, wherein each of the sensor units has a geometric center and the sensor units are arranged to have a distance between the geometric centers of two nearest sensor units shorter than 30 micrometers.

\* \* \* \* \*